March 30, 1926.
C. W. CHITTENDEN
ADJUSTABLE GAUGE
Filed Sept. 2, 1924
1,578,955
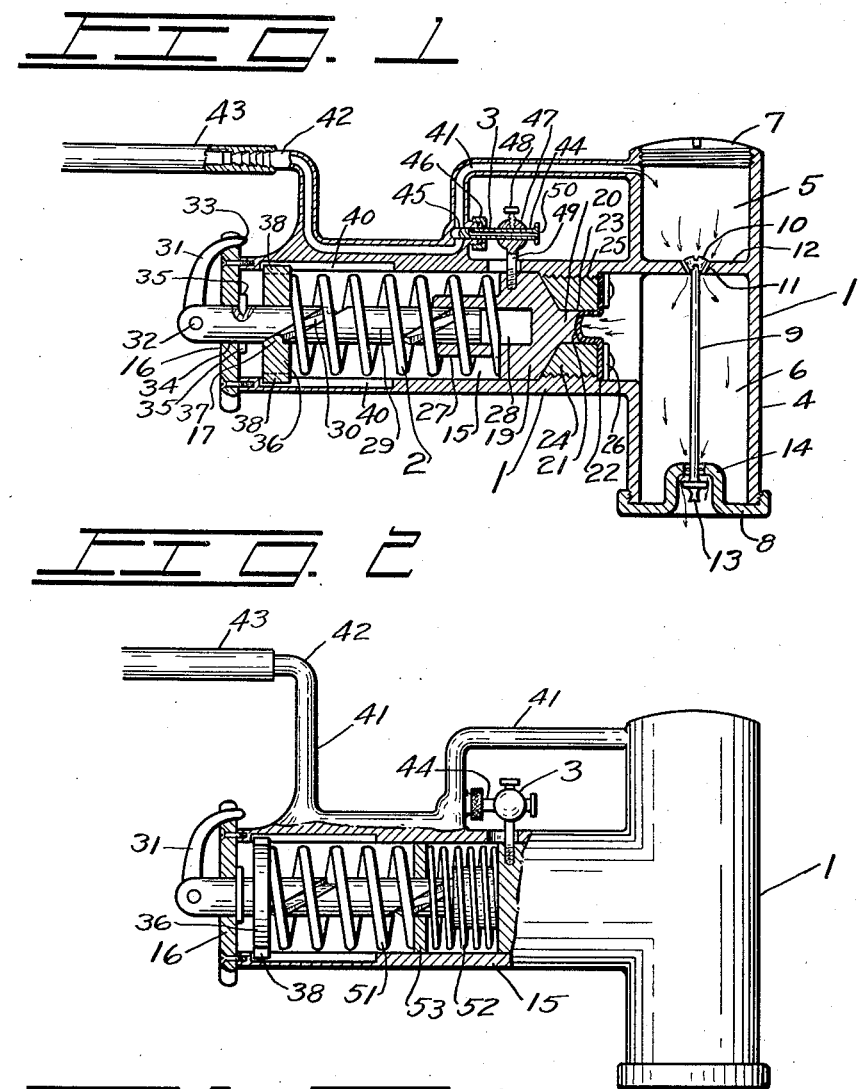
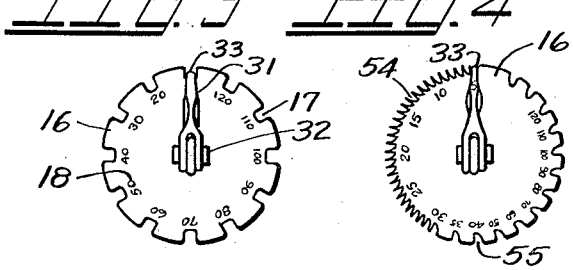
INVENTOR
Coy W. Chittenden
Harry Bowen
ATTORNEY Patented Mar. 30, 1926.

1,578,955

UNITED STATES PATENT OFFICE.

COY W. CHITTENDEN, OF HAZELWOOD, WASHINGTON, ASSIGNOR OF ONE-THIRD TO ROBERT R. STERLING, OF SEATTLE, WASHINGTON, AND ONE-THIRD TO EDWARD L. BONAMY, OF NEWCASTLE, WASHINGTON.

ADJUSTABLE GAUGE.

Application filed September 2, 1924. Serial No. 735,301.

*To all whom it may concern:*

Be it known that I, COY W. CHITTENDEN, a citizen of the United States, residing at Hazlewood, in the county of King and State of Washington, have invented a new and useful Adjustable Gauge; and I do hereby declare that the following is a full, clear, and exact specification, such as will enable others skilled in the art to which it appertains to make and use the same.

The invention is a gauge with a cut-off which may be set to different pressures so that it will permit a fluid to pass through it until it fills an object to a predetermined pressure.

The object of the invention is to provide an automatic shut-off pressure gauge with a means for setting the gauge so that it will operate at different pressures.

Another object of the invention is to provide a pressure gauge for filling tires or the like which will automatically shut off and whistle when the pressure in the tire reaches a predetermined amount.

And a still further object of the invention is to provide an automatic shut-off air gauge with a combined means for setting it to different pressures so that it may readily be set to a very low or to a very high pressure.

With these ends in view the invention embodies a gauge having a spring chamber with a means at one end for regulating the pressure on the spring, a means at the opposite end for shutting off the flow of a fluid through the device, and an elastic disc through which the pressure of the fluid in a chamber from which the fluid is flowing into a tire or the like, may act upon the shut-off means.

Other features and advantages of the invention, will be seen from the following description taken in connection with the drawings, wherein:—

Figure 1 is a longitudinal section through the device.

Figure 2 is a side view with part broken away showing an alternate design.

Figure 3 is a view showing the disc at which the pressure is regulated for the design shown in Figure 1.

Figure 4 is a view showing the disc at which the pressure is regulated for the design shown in Figure 2.

In the drawings I have shown my device as it would be constructed wherein numeral 1 indicates the casing, numeral 2 the adjustable spring, and numeral 3 the shut-off valve.

The casing 1 is provided with a vertical chamber 4 which is divided into two compartments 5 and 6 with a nut 7 at the upper end of the compartment 5 and a cap 8 at the lower end of the compartment 6. In the center of the chamber is a rod 9 which connects the valve 10 which seats on a beveled surface 11 in a partition 12 between the chambers 5 and 6 and a valve 13 in the offset portion 14 of the cap 8. It will be seen that the air pressure will normally hold the valve 10 closed and when the valve 13 is forced upward it will open the valve 10. It will also be seen that the opening around the valve 13 is somewhat larger than that of the valve 10.

The spring 2 is mounted in a horizontal section 15 of the casing 1, one end of which opens into the compartment 6 and the other end of which is provided with a disc 16 having notches 17 in its edge with numerals 18 indicating different pressures at the notches as shown in Figure 3. One end of the spring 2 bears against a member 19 which is slidably mounted in the section 15 and which is provided with a projection 20 at one end having a concave surface 21 at its outer end into which the elastic disc 22 will extend when pressure is in the chamber 6. The projection 20 slides in an opening 23 in a nut 24 which is screwed into the section 15 by the threads 25 and to which the disk 22 is held by a washer 26 as shown. The forward end of the member 19 is provided with a sleeve 27 having an opening 28 in it into which a rod 29 which has screw threads 30 on it, is slidably held. The outer end of the rod 29 has a finger 31 pivotally mounted in it on a pin 32 and the outer end 33 of the finger fits into the notches 17. The rod 29 passes through an opening 34 in the disc 16 and at the inner side of the disc are pins 35 which limit the outward movement of the rod.

On this rod is a washer 36 which has a projection 37 at its center and other projections 38 at the sides which latter projections fit into slots 40 in the casing. These latter projections prevent the washer rotating and it will be seen that as the rod 29 is rotated by the finger 31 the projection 37 which extends into the thread 30 will cause the washer to move on the rod and when the finger is turned in the desired direction it will move the washer inward and compress the spring. The amount of the compression may be regulated by placing the finger 31 in the notches 17.

The cut-off valve 3 is arranged in an inlet tube 41 which extends from the upper part of the compartment 5 in a horizontal line, then downward vertically, then horizontal for another short distance, and then upward to an end 42 where it may be connected to a hose 43 as shown in Figure 1. The valve 3 is constructed with a horizontal bar 44 which is slidable in an opening 45 which passes across the tube 41 and the outer end of which is provided with a stuffing box 46. The outer end of the bar 44 is held in a member 47 by a screw 48 and on the lower end of the member 47 is a threaded shank 49 which screws into the side of the member 19 so that as the member 19 is forced toward the spring by the pressure of the fluid in the compartment 6 it will move the rod 44 inward and close the tube 41. The rod 44 is provided with a small opening 50 in its center which extends out of one side a short distance from the inner end so that as the rod closes the tube 41 air will pass out of the opening 50 with a whistle or hissing noise so that the operator will receive an alarm when the pressure in the tire or the like reaches a predetermined amount and the air is shut off. It will be seen that if the device is set to a certain pressure the pressure of the fluid in the compartment 6 will automatically operate the cut-off valve as hereinbefore described as soon as the pressure in the compartment 6 reaches the pressure for which the device is set.

In the design shown in Figure 2 the construction is practically the same with the exception of the double spring which makes it possible to obtain a longer range of pressures to which the device may be set. In this design the horizontal section 15 is provided with a heavy spring 51 and a light spring 52 and a washer 53 between them. It will be seen that as the finger 31 is moved to set the device to a certain pressure the spring 52 will first be compressed and when it has reached its limit or is fully compressed the spring 51 will begin to compress and the remainder of the adjustment will be taken on the large spring. The disc 16 in this design is provided with small notches 54 for the distance the compression is being taken on the small spring and the larger notches 55 for the distance the compression will be taken on the large spring. This device is particularly adaptable for balloon tires as it will be seen that the low pressure may be set for each pound.

It will be understood that changes may be made in the construction without departing from the spirit of the invention. One of which changes may be in the design or arrangement of the casing; another may be in the arrangement of the cut-off valve or the means for operating it; and still another may be in the use of any other resilient means in place of the springs as shown.

The construction will be readily understood from the foregoing description. To use the device it may be connected to an air hose 43 as shown and the cap 8 may be placed over a tire valve. It will be seen that the valve will open the valve 10 and permit air to pass through the device into the tire. The pressure of the air in the tire may be regulated by placing the finger 31 in the notch opposite the number indicating the desired pressure and it will be seen that as the pressure of the tire reaches this amount it will automatically stop the flow of the air by cutting off the supply and at the same time cause a whistle to notify the operator. It will also be understood that the device may be used for anything else in which it is desired to regulate the pressure of the fluid.

Having thus fully described the invention what I claim as new and desire to secure by Letters Patent, is:—

In an adjustable pressure control valve, a casing having two cylindrical compartments perpendicularly disposed in relation to each other, one of said compartments having a partition through it forming an upper and a lower compartment, oppositely disposed valves connected by a common rod in the said compartment, one of the said valves being in the said partition and the other in the end of the said lower compartment, the valve in the said partition being automatically closed and held in a closed position by the air pressure except when it is opened by the valve of a tire, said perpendicularly disposed compartment having a valve seat in the inner end thereof, a slidable valve member, an elastic diaphragm acting against the said valve member, a combination of a large and small spring for normally holding said valve member against the seat, a screw in the center of the said springs, a disc on the said screw and bearing against the outer end of the said large spring, a graduated disc with notches in its edge at the outer end of the said casing, said disc having an opening therethrough through which the end of the screw projects, a curved lever pivotally mounted in the end of the said screw and engaging the notches in the edge of the said disc to hold the said screw in different positions and by which the said screw may be rotated, a cut off valve in a supply line entering the said casing, and means for operating the said cut off valve by the said slidable valve member.

COY W. CHITTENDEN.